3,317,498
AROMATIC ETHERS AS CATALYST ADJUVANTS FOR PRODUCTION OF CRYSTALLINE POLYOLEFINS
Arthur A. Harban and Charles W. Moberly, Bartlesville, Okla., assignors to Phillips Petroleum Company, a corporation of Delaware
No Drawing. Filed Jan. 3, 1963, Ser. No. 249,113
14 Claims. (Cl. 260—93.7)

This invention relates to a method for the production of a crystalline polyolefin. In one aspect, the invention relates to a polyolefin having a low amorphous content.

The polymerization of propylene in the presence of heterogeneous initiator systems comprising a heavy metal component such as titanium trichloride and an organometal such as a trialkylaluminum or a dialkylaluminum halide is well known and the polymers thus produced have found numerous uses. Many methods have been proposed for the polymerization of propylene in the presence of the aforementioned initiator systems such as the so-called vapor phase, slurry, and mass polymerization systems. In many of the known methods, the resultant polymerizate has intimately associated therewith greater or lesser amounts of very low molecular weight materials which, when removed, range from viscous liquids to soft tacky solids. In processing and fabrication operations using polymers of propylene containing appreciable amounts of said materials, objectionable color is frequently developed. The cause of such color development is not fully understood but it is believed to result from the presence of these low molecular weight components since in their absence, under the same conditions, it does not occur. It has also been observed that when the concentration of these low molecular weight fractions is high, e.g. above about 6 weight percent, bleeding may occur in the fabricated articles. In general it can be said that removal of these components from the polymer of propylene appears to have a favorable influence on properties of the polymer, such as hardness, modulus, ultimate tensile strength, range of melting temperatures, and molding and fiber forming properties as well as color.

It is an object of the invention to provide a crystalline polymer of an olefin.

It is another object of the invention to provide a polymer of an olefin having a low amorphous content.

It is another object of the invention to provide a method for the preparation of a polymer of an olefin having a low amorphous content.

It is another object of the invention to provide a method for the reduction of pentane solubles in polyolefins.

These and other objects of the invention will be readily apparent to those skilled in the art from the accompanying disclosure and appended claims.

It has now been discovered that certain aromatic ethers are useful catalyst adjuvants in the polymerization of 1-olefins having the structural formula R—CH=CH$_2$ wherein R is an alkyl radical having 1 to 4, inclusive, carbon atoms and provide a polymer of low amorphous content. These ethers correspond to the structural formula where $n=0$ to 5, $x=1$ to 3, R=hydrogen, alkyl, aryl, aralkyl, or alkaryl, at least one R must be other than hydrogen when $n=0$.

Typical aromatic ethers useful in the method of this invention include

Di(4-biphenyl)ether,
4-biphenyl phenylether,
Bis (m-phenoxyphenyl)ether,
2,3-diethyl-4-(m-tolylphenoxy)phenyl-4-benzoylphenyl ether,
m-(m-Phenoxyphenoxy)phenyl-m-phenoxy phenyl ether,
m-Phenyl-p(o-isopentylphenoxy)phenyl-o-isobutyl-p-phenoxy phenyl ether,
3(2,4 dimethyl-5-ethylphenoxy)-5-phenethylphenyl-2[3-n-heptyl-5(3-ethyl pentyl)phenyl]-4(4-phenyl-phenoxy)-phenyl ether,
Bis-[4-(4-phenoxyphenoxy)phenyl] ether, bis-(3-phenoxyphenyl)ether,
3(3-phenyl phenoxy)phenyl-3(2-phenoxyphenoxy) phenyl ether,
2-[2-phenoxy(2-phenoxy)phenoxy]phenyl-2-[(2-phenoxy)phenoxy]phenyl ether,
2-phenoxyphenyl-2-biphenylyl ether,
2-phenoxyphenyl-(2-n-propyl-4,5,diethyl)phenyl ether,
[2-p-tolyl-4(3-methyl-4-ethyl-5-benzyl)phenoxy-5-phenyl-6-n-hexyl]phenyl-3,4,5-tri-isopropylphenyl ether,
2-n-heptyl-3[3-methyl-5(3-isopentyl-5-n-butyl)phenoxy-6-phenyl]phenoxyphenyl-3(3,4,6-triisobutyl)phenoxy-5(3-biphenylyl)phenyl ether,
3[3-methyl-5(3-phenylphenoxy)]phenoxy-5-ethylphenyl-3[2-(3-benzylphenoxy)-4-n-propyl]phenoxy-5-ethyl phenyl ether and the like.

The invention is broadly applicable to the polymerization of olefins corresponding to the formula R—CH=CH$_2$, wherein R is selected from the group consisting of an alkyl radical containing from 1–4, inclusive, carbon atoms. Preferred olefins polymerized by the method of this invention include propylene, 1-butene, 1-pentene, 4-methyl-1-pentene, and the like.

For purposes of simplification, the invention is described herein with particular reference to the production of polypropylene having a low amorphous content as hereinafter defined; the invention is not to be so limited, however.

The polymerization process of this invention is conducted in the presence of the well known coordination catalyst system comprising two or more components wherein one component is an organometal compound, including compounds where one or more, but not all, organo groups are replaced by halogen, a metal hydride, or a metal of Groups I, II or III, and the second component is a Group IV, V, VI or VIII (Mendeleef's Periodic System) metal compound. The organometal compounds referred to include, without limitation, alkyl, cycloalkyl or aryl compounds, of mono-, di-, or trivalent metals, particularly aluminum, gallium, indium, beryllium, sodium, potassium, lithium, rubidium, cesium, magnesium, cadmium, mercury, zinc, barium, or such organometal compounds where one or more but not all, of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc fluoride, and dibutylaluminum bromide, octylaluminum diiodide, dipropylgallium, fluoride, dihexylgallium chloride, dicyclohexylgallium dibromide, eicosylgallium dibromide, ditetradecylgallium fluoride, dephenylindium chloride, octylindium difluoride, cyclohexylindium dibromide, methylberyllium bromide and the like. In shorthand form these organo-metal compounds can be described as compounds having the formula $R_nMX_m$ where R is selected from the group consisting of alkyl, cycloalkyl, aryl radicals and combinations thereof, X is selected from the group consisting of hydrogen and halogen, M is a metal selected from the group consisting of metals of Groups I, II, and III, $n$ is from 1 to 3, inclusive, $m$ is from 0 to 2, inclusive, and the sum of $m$ and $n$ is equal to the valence of metal M.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are applicable as a class, the most important members being sodium, magnesium and aluminum.

The compounds of the metals of Groups IV, V, VI and VIII of the Periodic System include the oxides, hydrides, halides, oxyhalides and salts of organic acids, usually having 20 or less carbon atoms, such as formic acid. It is usually preferred to employ compounds of elements of Groups IV-A, V-A, VI-A or VIII, for example titanium, zirconium, hafnium, chromium, thorium, molybdenum, vanadium, niobium, tantalum and iridium. Of these various compounds, it is generally preferred to employ the titanium halides, including the chlorides, fluorides, bromides and iodides, particularly the trichlorides, the tribromides, and the triiodides of titanium.

A third catalyst component which can be advantageously used is an organic halide or metal halide where the organic radical has 30 or less carbon atoms and is an alkyl, cycloalkyl or aryl group. Specific examples include ethyl bromide, bromobenzene, cyclohexyl chloride, and the like. Also applicable as third catalyst components are the alkali metal and ammonium halides, and aluminum halides (where the catalyst also includes another metal compound such as a titanium compound), a halogen, a hydrogen halide, an organophosphorus-containing compound, and a peroxide.

The invention is particularly advantageous when the aromatic ether is employed in conjunction with an initiator system comprising and alkyl aluminum and a titanium trihalide, for example, a triakyl aluminum or a dialkyl aluminum halide plus a titanium halide, such as titanium trichloride.

The preferred initiator system, particularly in the mass polymerization of propylene, comprises a dialkyl aluminum halide, more preferably a dialkylaluminum chloride, e.g., diethylaluminum chloride, and a titanium trichloride complex having the approximate formula

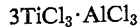

$$3TiCl_3 \cdot AlCl_3$$

which may be prepared by reacting aluminum with titanium tetrachloride.

The polymerizate removed from the reaction vessel will contain varying amounts of amorphous material, frequently in the neighborhood of 10 weight percent when employing the conventional organometal and titanium halide catalysts without the adjuvant of this invention. The permissible level of the amorphous fraction in the polymer product depends upon the ultimate use of the polymer, but in general, the content should be reduced to a level below about 4 weight percent based on the polymerizate, preferably below about 3 weight percent to avoid detrimental effects arising therefrom. This invention accomplishes this desired result. The term "polymerizate" refers to the polymer of an olefin, such as polypropylene, as it is formed in the reactor and includes occluded diluent, catalyst residues, low and high molecular weight amorphous and crystalline homopolymers and copolymers and the like.

The term "amorphous polymer," as used herein, refers to that portion of the polymer of 1-olefin prepared in presence of the heterogenous catalyst system herein described which is soluble in pentane based on the determination described in Example I. "Amorphous polymer" is conventionally referred to as "pentane solubles."

The ratio of the catalyst components employed in the present process can be varied rather widely depending upon the particular monomer employed and the operating conditions. The mol ratio of the organometal compound, metal hydride or metal of Group I, II or III metal to the Group IV, V, VI or VIII metal compound is usually in the range of 1:1 and 10:1 with a preferred range of 2:1 and 5:1. The concentration of catalyst in the polymerization zone is usually in the range of 0.01 to 5 weight percent based on the monomer charged to that zone although lesser or greater amounts can be employed.

The amount of the aromatic ether employed is in the range of between about 0.05 and about 15, preferably between about 0.1 and about 5 mols per mol of IV, V, VI or VIII metal compound. Conveniently, the aromatic ether is charged to polymerization zone along with the catalyst frequently as a solution in a hydrocarbon solvent, such as cyclohexane, heptane, or the like, although it is acceptable to charge the ether with either of the catalyst components or their admixture.

The polymerization of the 1-olefin with the catalyst and adjuvant of the invention can be conducted by any suitable means such as a solution process or the mass procedure and under conditions well known to those skilled in the art. As is well known to those skilled in the art, the polymerization of the alpha-olefins may be conducted in the presence of a hydrocarbon diluent which is inert and liquid under the conditions of the process and does not have a deleterious effect on the catalyst. Suitable diluents include paraffinic, cycloparaffinic, and/or aromatic hydrocarbons. Examples of such diluents include propane, butane, pentane, hexane, cyclohexane, methylcyclohexane, benzene, toluene, the xylenes, and the like. The relative amounts of diluent and olefin employed in the polymerization depend upon the particular conditions or techniques used and are generally governed by the capacity of the apparatus to effect suitable agitation and heat removal. The polymerization can be carried out at a temperature varying over a rather broad range, for example, at a temperature of −100 to 500° F. In general, pressures are satisfactory which are sufficient to maintain the reaction mixture substantially in the liquid phase.

Although the invention is not limited thereby, one particularly preferred method is the so-called mass polymerization system wherein the monomer, preferably the propylene, is liquefied and contacted in the reaction zone with a two or more component initiator system discussed hereinbefore, preferably in the presence of hydrogen. When employing propylene as the monomer and diluent, a suitable temperature is in the range of about 0 to 250° F.

The process of the invention can be carried out as a batch process, e.g. by pressuring the olefin to be polymerized into a reactor containing a catalyst system, the adjuvant and the diluent. Furthermore, the process can be carried out continuously by maintaining the reactants in the reactor for a suitable residence time. The residence time employed in the continuous process can vary widely since it depends to a great extent upon the temperature and the specific olefin. However, the residence time in a continuous process generally falls within the range of 1 second to 5 hours or more. In a batch process, the reaction time can also vary widely, such as from 15 minutes up to 24 hours or more.

The treatment of the polymerizate subsequent to the polymerization step depends upon the type of process employed for the polymerization. For example in a solution process upon completion of the polymerization, by one suitable method, any excess olefin is vented and the contents of the reactor are treated so as to inactivate the catalyst and remove the catalyst residue. The polymer is then precipitated and separated from the diluent by decantation, filtration or other suitable method, after which the polymer is dried.

In one suitable method in the mass polymerization process, the polymerizate from the reactor is charged to a suitable vessel and the catalyst residue is removed by contact with an extractant, such as diketone, e.g., acetylacetone, in the presence of propylene oxide. Prior to the discovery of the adjuvant herein it was generally necessary to wash the effluent with an extractant for the amorphous polymer, such as propylene, propane, or other hydrocarbon mixtures thereof, at a temperature preferably less than 80° F. After separation the polymer is dried.

One of the advantages of the invention is that a polymer having a low amorphous content is produced. Although the amorphous materials are generally soluble in hydrocarbons and can thus be removed by extraction, such procedures are time and labor consuming and require extensive and costly additional equipment. Thus, a satisfactory method for the prevention of their formation during polymerization constitutes a significant contribution to the art.

The designations for the periodic system classification utilized in the present specification and claims are in accordance with the periodic classification on page 28 of the book "Inorganic Chemistry," by T. C. L. Thorne and A. M. Ward, (Third English edition), published by Gurney and Jackson, London, England, 1939.

A more complete understanding of the invention can be obtained by referring to the following illustrative example.

Example

A series of runs was made in which propylene was polymerized in a mass system in the presence of a catalyst system comprising titanium trichloride complex $$(3TiCl_3 \cdot AlCl_3)$$

and diethylaluminum chloride, various ethers being added as adjuvants for the catalyst. In these runs a 1-liter stainless steel reactor, first purged at 250° F. with dry propylene was charged with a weighed amount of $3TiCl_3 \cdot AlCl_3$ followed by the diethylaluminum chloride dissolved in a small amount of cyclohexane. The ether adjuvant was incorporated in the DEAC solution prior to charging. To the reactor was introduced 150 grams of proylene and 1 liter (s.t.p.) hydrogen. The reaction was conducted at 130° F. for 2.5 hours. At the end of the run the polymer was recovered[1] and, without washing, was evacuated for pentane solubles.

Pentane solubles were determined by transferring the total polymer from the run to a cylindrical graduate and adding 450 ml. of pentane. The cylinder was closed with a stopper and shaken once each hour for four hours after which it was allowed to stand overnight. From the graduate was then removed 200 ml. of liquid. This liquid was evaporated to dryness after which it was heated at 110° C. for 15 minutes. The weight of residue was determined and the percent solubles in the total polymer calculated. Data on these runs are tabulated below.

ETHERS AS ADJUVANTS IN PROPYLENE POLYMERIZATION

| Run No. | DEAC[1] (gr.) | TiCl$_3$[2] (gr.) | Ether Used | | Mol Ratio Ether/TiCl$_3$ | Solubles Percent |
|---|---|---|---|---|---|---|
| | | | Name | Amt (gr.) | | |
| 1 | 0.234 | 0.100 | 4-Biphenyl phenyl ether | 0.080 | 1.93 | 3.66 |
| 2 | 0.219 | 0.094 | 4-Biphenyl phenyl ether | 0.020 | 0.515 | 2.72 |
| 3 | 0.226 | 0.097 | Bis (m-phenoxyphenyl) ether | 0.575 | 0.995 | 3.16 |
| 4 | 0.230 | 0.098 | M-bis (m-pp) benzene[3] | 0.020 | 0.270 | 1.22 |
| 5 | 0.241 | 0.103 | Dibenzyl ether | 0.0643 | 1.87 | 7.25 |
| 6 | 0.234 | 0.102 | Bis-2-chloroethyl ether | 0.0464 | 1.88 | 5.88 |
| 7 | 0.234 | 0.100 | Diethyl ether | 0.0444 | 3.56 | 15.4 |
| 8 | 0.243 | 0.104 | Diethyl ether | 0.0222 | 1.71 | 14.0 |
| 9 | 0.175 | 0.075 | None (Control) | | | 5.1 |
| 10 | 0.232 | 0.099 | Methylphenyl ether[4] | 0.108 | 1.09 | 7.5 |
| 11 | 0.232 | 0.099 | Methylphenyl ether[4] | 0.273 | 2.76 | 6.35 |
| 12 | 0.232 | 0.104 | None (Control) | | | 4.5 |

[1] Diethylaluminumchloride charged as 1.53 molar solution in n-heptane.
[2] TiCl$_3$ complex (3TiCl$_3$) prepared by reaction of TiCl$_4$ and Al.
[3] M-bis (m-phenoxyphenoxy) benzene. Solution of 0.02 gm. in 1 ml. cyclohexane added separately to reactor instead of incorporating with the DEAC solution.
[4] In cyclohexane, 0.0537 gr./ml.

These data show that the ethers within the scope of the invention provide a polypropylene product having a very low amorphous content as compared to runs employing no adjuvant and as compared to ethers outside the scope of the invention (e.g. alkyl ethers and alkyl-aromatic ethers).

While certain examples, structures, compositions and process steps have been described for purposes of illustration, the invention is not limited to these. Variation and modification within the scope of the disclosure and the claims can readily be apparent to those skilled in the art.

We claim:

1. A process for the production of a normally solid polymer of a 1-olefin having a low amorphous content comprising contacting under polymerization conditions a 1-olefin having the formula R—CH=CH$_2$ wherein R is an alkyl group having 1 to 4, inclusive, carbon atoms with a catalyst consisting essentially of a halide of a Group IV-A metal and a component having the formula R$_n$MX$_m$ wherein R is selected from the group consisting of alkyl, cycloalkyl, and aryl radicals and combinations thereof, X is from the group consisting of hydrogen and halogen, M is a Group III metal, $n$ is from 1 to 3, inclusive, $m$ is from 0 to 2, inclusive, and the sum of $n$ and $m$ is 3 in the presence of an aromatic ether represented by the structural formula

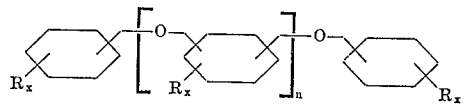

where $n=0$ to 5, $x=1$ to 3, R=hydrogen, alkyl, aryl, aralkyl, or alkaryl, at least one R must be other than hydrogen when $n=0$.

2. The process of claim 1 wherein said aromatic ether is present in an amount in the range between about 0.05 and 15 mols per mol of said halide of a Group IV-A metal catalyst component.

3. The process of claim 1 wherein said aromatic ether comprises 4-biphenylphenyl ether.

4. The process of claim 1 wherein said aromatic ether comprises bis(m-phenoxyphenyl)ether.

5. The process of claim 1 wherein said aromatic ether comprises m-bis-(m-phenoxyphenxy)benzene.

---
[1] By flashing of the excess propylene so there was no loss of pentane solubles.

6. A process for the production of a normally solid polymer of a 1-olefin having a low amorphous content comprising contacting an olefin corresponding to the formula $RCH=CH_2$ wherein R is selected from the group consisting of alkyl radicals containing from 1 to 4, inclusive, carbon atoms with a catalyst consisting essentially of a halide of Group IV-A metal and a component having the formula $R_nMX_m$ wherein R is selected from the group consisting of alkyl, cycloalkyl, and aryl radicals and combinations thereof, X is from the group consisting of hydrogen and halogen, M is a Group III metal, $n$ is from 1 to 3, inclusive, $m$ is from 0 to 2, inclusive, and the sum of $n$ and $m$ is 3, in the presence of an aromatic ether represented by the structural formula

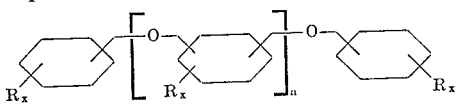

where $n=0$ to 5, $x=1$ to 3, R=hydrogen, alkyl, aryl aralkyl, or alkaryl, at least one R must be other than hydrogen when $n=0$, said aromatic ether being present in the range between about 0.05 and 15 mols per mol of said halide of a Group IV-A metal catalyst component. Said contacting occurring at a temperature in the range of 0 to 250° F. and a pressure sufficient to maintain said monomer in the liquid phase and recovering the solid polymer thus produced.

7. A process for the preparation of a normally solid polymer of propylene having a low amorphous content comprising contacting liquid propylene under polymerization conditions with a catalyst prepared by admixing a dialkyl aluminum halide and a titanium halide in the presence of an aromatic ether represented by the structural formula

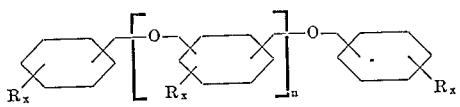

where $n=0$ to 5, $x=1$ to 3, R=hydrogen, alkyl, aryl, aralkyl, or alkaryl, at least one R must be other than hydrogen when $n=0$, and recovering the solid polymer thus produced.

8. The process of claim 7 wherein said catalyst is prepared by admixing diethyl aluminum chloride and a titanium trichloride·aluminum chloride complex having the appropriate formula $3TiCl_3 \cdot AlCl_3$.

9. A process for the production of a normally solid polymer of propylene having an amorphous content of less than 4 weight percent comprising contacting propylene with a catalyst prepared by admixing diethyl aluminum chloride and titanium trichloride with liquid propylene employed as the medium for contact and in the presence of an aromatic ether represented by the structural formula

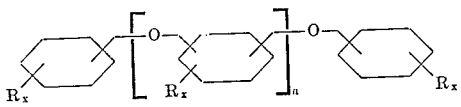

where $n=0$ to 5, $x=1$ to 3, R=hydogen, alkyl, aryl, aralkyl, or alkaryl at least one R must be other than hydrogen when $n=0$, said aromatic ether being present in an amount in the range between about 0.05 and 15 mols per mol of said titanium chloride, said contacting occurring at a temperature in the range of 0 to 250° F. and sufficient to maintain said propylene in the liquid phase and recovering the solid polymer of propylene thus produced.

10. The process of claim 9 wherein said aromatic ether comprises 4-biphenylphenyl ether.

11. The process of claim 9 wherein said aromatic ether comprises bis(m-phenoxyphenyl) ether.

12. The process of claim 9 wherein said aromatic ether comprises m-bis(m-phenoxyphenoxy)benzene.

13. A process for the preparation of a normally solid polymer of propylene having a low amorphous content comprising contacting liquid propylene under polymerization conditions with a catalyst prepared by admixing a dialkyl-aluminum halide and a titanium halide in the presence of M-bis-(M-phenoxyphenoxy)-benzene and recovering the solid polymer thus produced.

14. A process for the preparation of a normally solid polymer of propylene having a low amorphous content comprising contacting liquid propylene under polymerization conditions with a catalyst prepared by admixing diethylaluminum chloride and a titanium trichloride-aluminum chloride complex having the approximate formula $3TiCl_3–AlCl_3$ in the presence of M-bis-(M-phenoxyphenoxy)-benzene and recovering the solid polymer thus produced.

References Cited by the Examiner

UNITED STATES PATENTS 3,141,872  7/1964  Natta et al. _____ 260—93.7

FOREIGN PATENTS 564,772  8/1958  Belgium.
1,310,774  10/1962  France.

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,317,498  May 2, 1967

Arthur A. Harban et al.

It is hereby certified that error appears in the above numbered patent requiring correction and that the said Letters Patent should read as corrected below.

Column 6, line 75, for "m-bis-(m-phenoxyphenxy)" read -- m-bis-(m-phenoxyphenoxy) --; column 7, line 23, after "in" insert -- an amount in --; line 24, for "component." read -- component, --; line 25, for "Said" read -- said --.

Signed and sealed this 21st day of November 1967.

(SEAL)
Attest:

Edward M. Fletcher, Jr.
Attesting Officer

EDWARD J. BRENNER
Commissioner of Patents